United States Patent [19]
Roberts

[11] 3,814,114
[45] June 4, 1974

[54] APPARATUS FOR STORING DENTAL FLOSS AND FOR HOLDING DENTAL FLOSS DURING USE

[76] Inventor: Edward J. Roberts, 2630 Hollow Hook, Houston, Tex. 77055

[22] Filed: Oct. 17, 1972

[21] Appl. No.: 298,271

[52] U.S. Cl............................................. 132/92 A
[51] Int. Cl............................................. A61c 15/00
[58] Field of Search.............. 32/40; 132/89, 90, 91, 132/92 A, 92 R

[56] References Cited
UNITED STATES PATENTS
1,644,390  10/1927  Miller.................................. 132/91
2,607,358  8/1952  Maas.................................. 132/92 R
2,962,033  11/1960  Lew.................................. 132/92 R
3,672,377  6/1972  Greenacre.......................... 132/92 R

*Primary Examiner*—Robert Peshock
*Attorney, Agent, or Firm*—Carl B. Fox, Jr.

[57] ABSTRACT

Apparatus for storing dental floss and for holding dental floss during use. The dental floss is stored in a cassette from which it is withdrawn for use. In use, dental floss is held across the mouth of a yoke, and the dental floss after use is replaced by a fresh length of dental floss withdrawn from the cassette. The yoke is inserted into the mouth to apply the dental floss to the teeth.

4 Claims, 6 Drawing Figures

APPARATUS FOR STORING DENTAL FLOSS AND FOR HOLDING DENTAL FLOSS DURING USE

SUMMARY OF THE INVENTION

The use of dental floss to clean and exercise the teeth and gums is prescribed by dentists for many persons. Most all persons should use dental floss even though its use is not specifically prescribed by a dentist. The use of dental floss is an awkward and unhandy procedure, and consequently many persons do not use dental floss regularly. Since dental floss is usually held by the hands during use, it is necessary that a finger of each hand of the user be inserted into the mouth. This is awkward and often times ineffectual, since proper gripping of the dental floss is difficult to achieve and very often it will be found that the fingers holding the dental floss are either too close together or too far apart to efficiently apply the floss needed, and it will frequently occur that the floss will slip during use. Dental floss must be held very tightly tensioned during use in order to be effective, and achieving this with the hands is fairly difficult.

The apparatus afforded according to the present invention solves all of the problems encountered when dental floss is held by hand for use. The apparatus has a yoke at one end across the mouth of which the dental floss is tightly carried. A supply of dental floss is kept in a cassette preferably disposed at the opposite end of the apparatus, from which it is withdrawn for use. The dental floss extending across the yoke is locked or anchored during use by a novel locking device, which additionally serves to tighten the dental floss when operated to lock the dental floss in place. After a length of dental floss has been used, a convenient cutter on the apparatus may be used for cutting it off to be discarded.

Another advantage of the invention is that through use of the herein disclosed apparatus less dental floss will be used. Ordinarily, when dental floss is held by hand, a substantial length, say, up to 18 inches, must be used because of the necessity of wrapping the floss around the fingers at each end for adequate holding of the floss. In using the herein described apparatus, however, a substantially shorter length of about 6 inches or less is required for each application of dental floss to the teeth. This result is obtained because of the novel locking device which does not require use of substantial lengths of dental floss for wrapping or tying the ends of the dental floss.

The yoke which holds the dental floss during use is conveniently designed. The angularity of the yoke is such that it may be readily inserted into the mouth to apply the dental floss to and between the teeth at any part of the mouth and at either the upper or the lower rows of teeth. The yoke spacing is made large enough, preferably at least three-fourths inch, so that when the apparatus is used in any part of the mouth the teeth and gums will easily be received therebetween.

The storage of the dental floss in the cassette portion of the apparatus before use provides that the dental floss is maintained in clean and sanitary condition.

Other objects and advantages of the invention will appear from the following detailed description of a preferred embodiment, reference during the description being made to the accompanying drawings.

DESCRIPTION OF THE PREFERRED EMBODIMENT

Figure 1:
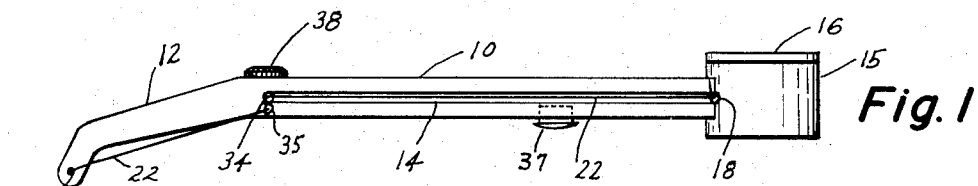
FIG. 1 is a side elevational view of a preferred embodiment of apparatus according to the invention.
Figure 2:
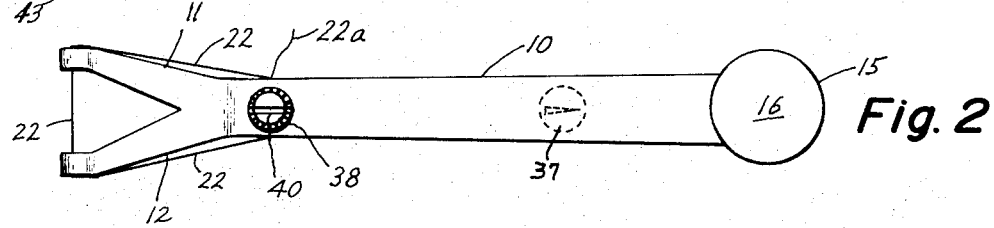
FIG. 2 is a top view of the apparatus shown in FIG. 1.
Figure 3:
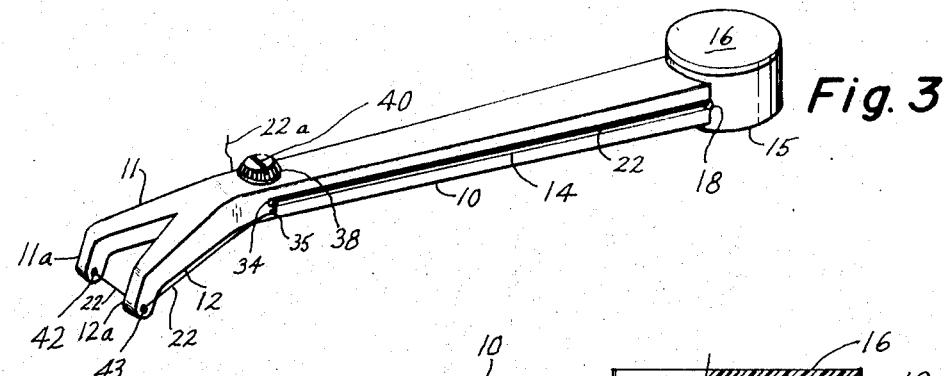
FIG. 3 is an upper perspective view of the apparatus shown in FIG. 1.
Figure 4:
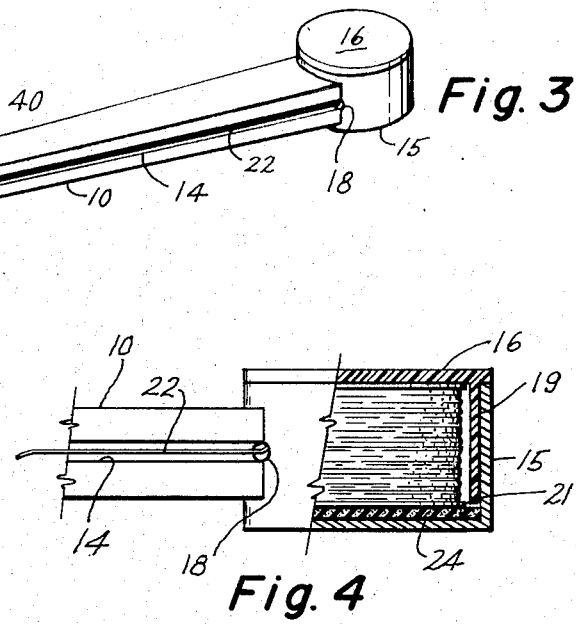
FIG. 4 is a vertical cross sectional view of the cassette end of the apparatus.

Referring now to the drawings in detail, the preferred form of apparatus shown in the drawings has a body in the form of the handle 10, which is slightly tapered from end to end and has at one end a yoke formed by arms 11, 12. Each arm 11, 12 extends at an angle from the end of handle 10 and is bent at a sharper angle at its extreme end at 11a, 12a. The angle of arms 11, 12 with handle 10 is preferably about 10 degrees, and arm ends 11a, 12a are preferably at an angle of about 70° with arms 11, 12, and about 80° with handle 10.

A longitudinal groove 14 is formed along each side of handle 10. A cassette 15 having cover 16 is integrally formed with the end of handle 10 opposite the yoke. Cassette 15 is of cylindrical form, with handle 10 connected at one cylindrical side thereof. A hole 18 is formed through the wall of cassette 15 at the end of each groove 14, one groove 14 being on each side of the handle as described.

Cover 16 of cassette 15 has a skirt 19 inwardly spaced around its edge, the skirt fitting closely within cassette 15. A spool or reel 21 carrying a roll of dental floss 22 is disposed within cassette 15, skirt 19 of cover 16 surrounding the reel or spool of dental floss and having a slot (not shown) adjacent the holes 18 to allow passage of dental floss therepast. A pad 24 of elastomeric material, such as foam plastic or foam rubber, is disposed within the bottom of cassette 15. Pad 24 provides that spool 21 will be frictionally engaged within cassette 15 so that the spool will not rattle and so that dental floss 22 will not accidentally be unrolled therefrom. Spool 21 is held under sufficient pressure that dental floss may be drawn therefrom, with rotation of the spool, but the spool will not be rotated accidentally.

Figure 5:
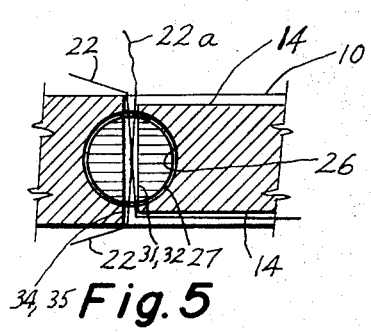
FIG. 5 is an enlarged horizontal cross sectional view, partly schematic, taken through the lock mechanism of the apparatus of FIGS. 1 and 2.
Figure 6:
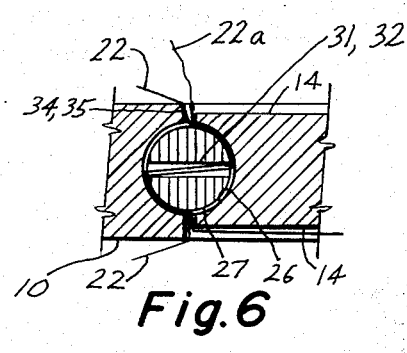
FIG. 6 is similar to FIG. 5, showing the lock mechanism in moved position.

A cylindrical opening 26 is formed through handle 10 adjacent the yoke. A cylindrical plug 27 is disposed within opening 26, the fit being such that plug 27 will not accidentally fall from the opening. The plug has a sufficient frictional engagement with the opening to be rotatably held in place therein. A pair of cross passages 31 and 32 of small diameter sufficient to pass dental floss therethrough are provided through plug 27, one above the other. FIGS. 5 and 6 are schematic in that only one of the plug passages 31, 32 is shown, and two strands of floss are shown disposed therethrough. Actually, each strand passes through a separate one of the passages 31, 32. Handle 10 has therethrough corresponding passages 34, 35 which are in register with plug passages 31, 32, respectively, when the plug passages are turned in directions crossways of handle 10. The handle has passages or openings 34, 35 at each side so that separate portions of dental floss may be passed through opposite passages 34 and passage 31, and through opposite passages 35 and passage 32.

A knife 37 of tall triangular cross section with a cutting edge at the sharp apex, and having a rounded button formation at its outer end, is pressed tightly into a correspondingly shaped hole in the bottom of handle 10, spaced from plug 27. Used floss may be cut off at knife 37, and the remaining free end of the floss extending from passage 35 may be wedged under the button or wrapped around the knife to be secured.

Plug 27 has a turning knob 38 which is beveled and ribbed around its periphery. A groove 40 indicates the direction of rotation of knob 38 and plug 27.

Yoke arm 11 has an opening 42 therethrough near the tip of its portion 11a. Yoke arm 12 has an opening 43 therethrough near the tip of its portion 12a. These openings are of suitable diameter to freely introduce therethrough the end of a strand of dental floss.

To use the apparatus, the cover 16 of cassette 15 is removed and a reel or spool 21 of dental floss 22 is placed therein. The end of the dental floss is passed through one of the holes 18, at either side of handle 10. The cover 16 is replaced and additional dental floss is drawn from the reel and the end thereof is inserted through opening 34 at one side of the handle and through upper hole 31 of plug 27, and thence out through the other hole 34 at the opposite side of handle 10. The alignment mark or groove 40 is at this time rotated so that openings 31, 32 are aligned with openings 34, 35. The end of the dental floss is then inserted through one of the holes 42 or 43, at the side of the apparatus from which the dental floss emerges from one of the holes 34. Then the end of the dental floss is drawn across the mouth of the yoke and inserted through the other hole 42 or 43. Next, the end of the dental floss is inserted into the hole 35 at the appropriate side of the handle and through hole 32 to emerge through the opposite hole 35. The dental floss is drawn fairly tight by hand and knob 38 is rotated, preferably about 90°, as indicated by the position of alignment groove 40. This movement of the plug serves to further tighten the dental floss at the yoke and to anchor both ends of the dental floss. The end of the floss extending out of a hole 35 is indicated by reference numeral 22a.

The yoke end of the apparatus is inserted into the mouth to apply the portion of floss extending between the yoke arms, i.e., across the mouth of the yoke, to the teeth. The dental floss may be moved to between adjacent teeth and against the gums to exercise the gums and to remove particulate matter from between the teeth. Exercising of the gums in this manner plus the removal of lodged materials from between the teeth is extremely important to good dental health, and in particular for persons with gum and other dental problems requiring use of dental floss regularly.

The dental floss extending from a hole 18 to the corresponding passage 34 at the same side of the apparatus lies in one of the grooves 14 along a side of handle 10. As will be apparent, the floss may be fed from either hole 18 at either side of the handle to the corresponding passage 34. After the dental floss between the yoke arms has been used and is to be replaced, knob 38 is rotated to align groove 40 crossways of the handle, to align passages 31, 32 with passages 34, 35, and the end 22a of the dental floss is pulled so that the dental floss across the yoke arms is replaced by a fresh length thereof withdrawn from cassette 15. The knob 38 is again rotated to position passages 31, 32 longitudinally of the handle, this again locking the dental floss securely in place and tightening it. The excess length of the end 22a of the dental floss is conveniently trimmed by pulling end 22a against knife formation 37 to cut it off.

Referring now to FIGS. 5 and 6 of the drawings, when the dental floss is pulled through passages 31, 32 (shown as one) the passages being in line with 34, 35 (also shown as one), the dental floss freely moves therethrough and may be fed into either passage 34 or 35 without difficulty, these holes being sufficiently large for this purpose. When plug 27 is rotated by rotation of knob 38 to the position shown in FIG. 6, the dental floss extending through both passages 31 and 32 is wedged between the already frictionally fitted plug 27 and opening 26 to be held against slippage therein. The plug rotation additionally stretches the dental floss which extends through passages 42, 43 of the yoke so that the dental floss extending across the mouth of the yoke is tightened. Thus, an apparatus is provided which suitably holds dental floss for use without the necessity of wrapping the dental floss around the fingers or around other implements.

The spacing between portions 11a, 12a of the yoke is wide enough that the dental floss may be applied to any teeth at any portion of the mouth. The angularities of the arms of the yoke are such as to provide utmost convenience is reaching any part of the interior of the mouth for application of the dental floss.

As will be apparent, only a relatively short length of dental floss is used during each use of the apparatus. The total length of dental floss extending around the yoke is less than 6 inches. When dental floss is wrapped around a finger of each hand for use, a considerably longer length of dental floss, at least something like 15 to 18 inches, is used. Therefore, use of the apparatus results in a considerable saving in the amount of dental floss used.

As will be apparent, the cassette 15 may be adapted to hold any form of roll, reel, or spool of dental floss, and the shape shown in the drawings is only exemplary. If dental floss in reel or spool form is not readily available, a length of dental floss may be placed through a hole 18 and used in the described manner. The excess dental floss may either trail from cassette 15 or may be stored loosely within cassette 15. A length of dental floss of only about 6 inches may be introduced at the yoke of the apparatus in the described manner without use of cassette 15, if desired.

The yoke end of the apparatus which is placed within the mouth of the user may be readily washed by placing it under a faucet, with or without use of soap for cleaning purposes.

While a preferred embodiment of the apparatus has been shown in the drawings and described, many modifications thereof may be made by a person skilled in the art without departing from the spirit of the invention, and it is intended to protect by Letters Patent all forms of the invention falling within the scope of the following claims.

I claim:

1. Apparatus for holding dental floss during application of the dental floss to the teeth and gums, comprising elongate body means forming a handle, said body means having a pair of arms at one end forming a yoke, dental floss support means at the end of each said arm, lock means on said body means adapted to lock the ends of a length of dental floss extending from said lock means across said floss support means at the ends of said arms and back to said lock means, comprising of an opening into said body means with plug means closely yet rotatably disposed into said opening, passage means transversely through said body means through said plug means, said plug means being rotatable in said opening between a position wherein said body means and plug means passages are aligned and positions wherein said passages are not aligned, the ends of said length of dental floss being inserted through said body means and plug means passages while the same are in aligned positions and rotation of said plug means to non-aligned passage positions causing stretching and anchoring of the dental floss, cassette means connected to said body means for containing a roll of dental floss, opening means through the wall of said cassette through which dental floss may be drawn from said roll, the dental floss drawn from said roll being inserted into said lock means and extended across said floss support means and back to said lock means and tightened and anchored, said body means having an elongate groove along opposite sides thereof extending from said opening through the wall of said cassette and one end of said body means passage means.

2. The combination of claim 1, there being two parallel said passages through each of said plug means and said body means, one end of the dental floss being inserted through each of said passages.

3. The combination of claim 1, each said floss support means comprising a hole through the end of one of said arms adapted to receive the dental floss therethrough.

4. The combination of claim 3, each arm being at an angle of approximately 10° from the direction of said body means, the end of each arm being at an angle of approximately 80° from the direction of said body means, the spacing between the ends of said arms being at least three-fourths inch.

* * * * *